United States Patent
Portell Guarch (10) Patent No.: US 10,560,531 B2
(45) Date of Patent: Feb. 11, 2020

(54) LOCATION-BASED SYSTEM AND METHOD FOR CONTROLLING A PLURALITY OF ELECTRICAL OR ELECTRONIC DEVICES

(71) Applicant: Beabloo, S.L., Barcelona (ES)

(72) Inventor: Jaume Portell Guarch, Barcelona (ES)

(73) Assignee: Beabloo, S.L., Barcelona (ES)

( * ) Notice: Subject to any disclaimer, the term of this patent is extended or adjusted under 35 U.S.C. 154(b) by 0 days.

(21) Appl. No.: 16/079,568

(22) PCT Filed: Feb. 22, 2017

(86) PCT No.: PCT/ES2017/070094
§ 371 (c)(1),
(2) Date: Aug. 24, 2018

(87) PCT Pub. No.: WO2017/144755
PCT Pub. Date: Aug. 31, 2017

(65) Prior Publication Data
US 2019/0058766 A1    Feb. 21, 2019

(30) Foreign Application Priority Data
Feb. 24, 2016 (ES) .................. P201630204

(51) Int. Cl.
*H04L 29/08* (2006.01)
*H04W 16/18* (2009.01)
(Continued)

(52) U.S. Cl.
CPC ............ *H04L 67/125* (2013.01); *G08C 17/02* (2013.01); *H04W 4/029* (2018.02); *H04W 4/80* (2018.02);
(Continued)

(58) Field of Classification Search
CPC .. G01S 5/14; G01S 5/06; H04W 4/02; H04W 4/80; H04W 84/18; G07C 2209/63; H04L 67/125
See application file for complete search history.

(56) References Cited

U.S. PATENT DOCUMENTS

| | | | |
|---|---|---|---|
| 2002/0072356 A1* | 6/2002 | Yamashita | H04M 1/72533 455/420 |
| 2014/0375421 A1 | 12/2014 | Morrison et al. | |

(Continued)

FOREIGN PATENT DOCUMENTS

WO    WO 2017/144755    8/2017

OTHER PUBLICATIONS

Informe de Busqueda Internacional y Opinion Escrita [International Search Report and the Written Opinion] dated May 8, 2017 From the International Searching Authority Re. Application No. PCT/ES2017/070094 and Its Translation of Search Report Into English. (14 Pages).

(Continued)

*Primary Examiner* — Nizar N Sivji (57) ABSTRACT

The present invention relates to a location-based system and method for controlling electrical or electronic devices comprising: beacons coupled to said devices for sending and receiving positioning signals; a control device for determining the position thereof, on the basis of the positioning signals received, and sending it to a central control module together with indications to act on a parameter of the devices; a central control module for sending control instructions to a processor module of the corresponding device, which is determined depending on the position of the control device; and a processor module, coupled to each of the devices, for directly acting on the parameters of the device depending on the control instructions received.

14 Claims, 3 Drawing Sheets

(51) Int. Cl.
    *G08C 17/02*     (2006.01)
    *H04W 4/029*     (2018.01)
    *H04W 4/80*     (2018.01)
    *H04W 84/18*     (2009.01)

(52) U.S. Cl.
    CPC ........ *H04W 16/18* (2013.01); *G08C 2201/40* (2013.01); *G08C 2201/50* (2013.01); *G08C 2201/91* (2013.01); *H04W 84/18* (2013.01)

(56) References Cited

U.S. PATENT DOCUMENTS

| | | |
|---|---|---|
| 2015/0296598 A1 | 10/2015 | Haid et al. |
| 2018/0091935 A1* | 3/2018 | Renaldi .................... H04W 4/02 |
| 2018/0338241 A1* | 11/2018 | Li ........................ H04L 12/2809 |

OTHER PUBLICATIONS

Kastrenakes "Philips Takes on Apple's iBeacon With Lights That Send Deals to Your Smartphone", The Verge, 3 P., Feb. 17, 2014.
Wikipedia "iBeacon", Wikipedia, The Free Encyclopedia, 7 P., Feb. 2, 2016.
Wright "GE Lighting and ByteLight Demo LEDs and Location Services at LFI", LEDs Magazine and Illumination in Focus, 3 P., Jun. 9, 2014.

\* cited by examiner

ND METHOD
LOCATION-BASED SYSTEM AND METHOD FOR CONTROLLING A PLURALITY OF ELECTRICAL OR ELECTRONIC DEVICES

RELATED APPLICATIONS

This application is a National Phase of PCT Patent Application No. PCT/ES2017/070094 having International filing date of Feb. 22, 2017, which claims the benefit of priority of Spanish Patent Application No. P201630204 filed on Feb. 24, 2016. The contents of the above applications are all incorporated by reference as if fully set forth herein in their entirety.

FIELD AND BACKGROUND OF THE INVENTION

The present invention can be applied in the technical sector of remote control systems, and more specifically in geospatial location-based control systems of electrical and/or electronic devices.

Deploying networks of electrical or electronic devices without a known geospatial location is very common today. Primarily in ample physical settings, such as commercial premises, offices, or warehouses, these networks of electrical or electronic devices are often created to provide certain services to relevant parts of the physical space in a more or less homogenous manner, such as for example the networks of lighting devices or sound devices, which, deployed in higher or lower areas, homogenously distribute light and sound in the physical space of surface areas, such as department stores, for example. Another example is the deployment of WiFi access points, which are homogenously distributed to provide coverage in physical spaces such as shopping malls or airports, for example.

The distribution of any of these or other electrical or electronic devices in physical spaces of a certain size involves the need to perform different tasks with them such as: locating the devices so they are accessible in order to utilize them; locating them to perform maintenance tasks; acting on them remotely for activation, deactivation, modification of their performance, etc.

On the other hand, these large spaces usually require a number of access points for accessing the power supply grid, so a number of sockets are also distributed for connecting electrical devices, such that it is more or less possible to connect electrical equipment, such as a vacuum cleaner or a mobile telephone charger, for example, in any part of the physical space.

Problems arise first with regard to the location of the electrical or electronic devices, since the state of the art offers barely any alternative solutions besides visual signaling. It is therefore common to install signs in the vicinity of the electrical or electronic device at hand (WiFi area indicator, socket area indicator for charging mobile phones at an airport, etc.). On other occasions, both paper maps and digital maps are used and made available to the users of the space (maps in an airport where are indicated the mobile telephone charging areas or areas with WiFi coverage) or made available only to the maintenance personnel for these networks of devices, in order to make it easier to locate said devices. What is even more surprising is that there are other solutions that incorporate lighting mechanisms above the devices themselves to help visually detect them (for example, lighting up the contour of a socket).

The obvious limitation of having to use visual mechanisms for locating the devices is that the presence of said devices being detected by all the users of the space may not always be of interest. For example, sockets in certain spaces in airports are usually hidden to prevent travelers from connecting devices that may compromise the stability of the electrical system in the event of a short-circuit, but they are there in any case in order to allow authorized personnel to utilize them for previously approved uses, such as for cleaning actions or for plugging in an information board.

On the other hand, the devices have occasionally been moved without having updated the maps indicating their location; for example, in the case of WiFi access points, this is somewhat common since a different physical location can considerably improve the their coverage. Given that WiFi access points are not particularly innocuous as regards their visual aspect, architects or designers usually prefer to physically locate them in spaces that cannot be seen by the users of the space, such as in false ceilings or false floors. The combination of both greatly hinders the location of these access points for maintenance tasks, and there are no known efficient mechanisms for locating them save opening up ceilings or floors.

Secondly, remotely acting on said electrical or electronic devices is also a drawback for the state of the art. In spaces such as department stores, physical spaces usually delimit different value propositions displayed for the public and the content often varies according to various interests either because new products are introduced or because needs change depending on the time of year, weather conditions, or trends or interest shown by customers or other reasons. Given that each product or service area has a different priority and level of interest, the corresponding electrical or electronic devices must enable being set to regulate, for example, the intensity of lighting devices by specific areas, for each product line, for service areas, shop window displays, or even completely shut off some areas to attract attention to others. However, so as to enable regulating the light intensity by areas, systems existing in the state of the art only propose creating light circuits with previously established regulation mechanisms, usually wiring and sometimes by means of wireless systems which allow regulating the light intensity of predetermined groups of lighting devices by means of switches. The huge drawback of these systems is that they require creating beforehand the circuits clustering lights together in a specific manner, and therefore do not provide the flexibility required to cluster or decluster said circuits in an easy and dynamic manner. Furthermore, these solutions also require the operator to be entirely familiar with the installation in order to know which switches need to be activated at all times in order to regulate a specific group of lights, which makes it tremendously difficult to be able to act remotely on the electrical or electronic devices with the desired speed.

Thirdly, with the recent emergence of BLE (Bluetooth Low Energy) technology, public spaces and shops are deploying small devices, called beacons or BLE emitting devices which help other mobile devices equipped with Bluetooth and an application software particularly developed for the purpose of very precisely detecting their location in the space. As a result of this precise location in the space, the application can provide specific location-based information to the users of the application, such as sales, recommendations, information about how to get to another location, etc. The problem is finding the actual beacons when their batteries need to be replaced or any change in configuration has to be done because even though there are beacons based on devices connected to the power grid, autonomous beacons powered by an internal battery are more common and can be deployed in shopping areas without having to do any sort of electrical installation. The drawback of said designs is the limited service life of the batteries, which means that operators of the networks of beacons have to replace them every so often and particularly check the state of the batteries on a regular basis so that the functionality of the users of the applications in said physical spaces is not affected.

Given that the object of the deployment of beacons in public spaces or shopping areas is to unequivocally indicate location, it is essential that said beacons are not moved and that the operators of the network of beacons know exactly where they are located at all times so as to enable linking each physical place with the corresponding information and not make a mistake showing unsuitable messages. For the same reasons, it is essential to replace the battery when it is close to the end of its service life, and to that end it is necessary to know which beacons have a battery that is close to the end of its service life and exactly where there are located.

The state of the art offers solutions for solving this need to locate the beacons by means of beacon detection mobile applications (scanning applications) which allow checking for their actual location by means of scanning the public space with the mobile device, but they require human intervention and only allow assuring that the beacons were in a given location at the time the check was run, not continuously. On the other hand, given that the beacons must be hidden from the public to prevent theft or vandalism, locating them with scanning applications may be difficult since the beacons do not reveal their position by means of any visible signal nor do they emit any audible signal when the search is being conducted, but no matter how precise the locating may be, if the beacon is not visible there is always certain degree of uncertainty.

According to the foregoing, the solutions known up until now through the state of the art have not offered any flexible and completely autonomous solution for the control of electrical or electronic devices, primarily luminous devices, which can adapt to the changing needs of users without a complex prior step of designing physical circuits and a subsequent step of training maintenance personnel for using suitable switches. As a result, any method or system making progress in the control of said electrical or electronic devices, primarily lighting devices, would be received in the state of the art as a valuable contribution.

SUMMARY OF THE INVENTION

The present invention solves the aforementioned problems by offering a flexible and autonomous solution which, with barely any human intervention at all, allows remotely controlling a plurality of electrical or electronic devices without making or modifying any physical connections. To that end, a first aspect of the present invention relates to a location-based system for controlling a plurality of electrical or electronic devices (50). The system comprises:
- positioning means (1) coupled to each of the electrical or electronic devices, configured for sending and receiving positioning signals;
- a control device (53) configured for receiving the positioning signals, determining the position thereof on the basis of the positioning signals received, and sending messages with information about said position to a central control module (51), together with indications to act on at least one parameter of one of the electrical or electronic devices;
- a central control module (51) configured for receiving the messages from the control device and sending control instructions to a processor module of at least one of the electrical or electronic devices, wherein the at least one device is determined depending on the information about the position of the control device contained in the received message;
- a processor module (4) coupled to each of the electrical or electronic devices, configured for directly acting on the at least one parameter of the electrical or electronic device (55) depending on the control instructions received from the central control module.

The electrical or electronic devices are preferably connected to a supply point of a power grid and each of the positioning means coupled to the electronic devices is supplied by the same supply point as its corresponding electronic device. Dependence on batteries with a limited service life and the battery maintenance and monitoring tasks involved are thereby advantageously prevented.

According to one of the embodiments of the invention, the positioning signals sent by the positioning means comprise a unique identifier, associated with one of the electrical or electronic devices, and information about the emitting power. The distance at which the positioning means corresponding to the received identifier are located can thereby be determined upon receiving the signals in the control device by means of comparing the received power and the power emitted.

According to one of the embodiments of the invention, the positioning means comprise a Bluetooth 4.0 emitter and receiver with beacon functions.

In one of its embodiments, the present invention contemplates the control device being a mobile telephone, a tablet, or any other portable electronic device with Bluetooth 4.0 signal transmission/reception capabilities.

According to one of the embodiments of the invention, the central control module is configured for creating a two-dimensional map with the location of all the electrical or electronic devices.

It is additionally contemplated the central control module furthermore being configured for determining the sending of the control instructions to the processor module of the electrical or electronic device closest to the control device by means of comparing the information about the position received from the control device with the map of the electrical or electronic devices.

In one of its particular embodiments, the present invention contemplates the processor module comprising a USB connector (21) for connecting and supplying the positioning means, a power supply (22), a general-purpose input/output module (23), a communication module (24) with Ethernet and/or WiFi network interfaces, and a CPU processing module (25) with a microprocessor and storage means.

According to one of the embodiments of the invention, the electrical or electronic devices being luminous devices and the parameter that is acted on being the intensity of the luminous device are contemplated.

In one of the particular embodiments of the invention, the luminous devices are LED-type luminous devices and comprise a LED controller module (30) in turn comprising: an electromagnetic interference filter (31), a power correction PFC module (32), a Buck-type converter (33), a microcontroller (34), and a microswitch (35); and a LED module (40) comprising a heat sink (41), a thermal interface (42), a PCB board (43), LED devices (44), and a primary optic (45).

One of the embodiments of the invention contemplates the electrical or electronic devices being sound devices, WiFi access points, or sockets.

A second aspect of the invention relates to a location-based method for controlling a plurality of electrical or electronic devices. The method comprises the steps of:
a) sending at least one positioning signal from positioning means coupled to each of the devices;
b) receiving the at least one positioning signal in a control device;
c) obtaining information about the position of the control device, depending on the positioning signals received;
d) sending a message to a central control module with indications for acting on at least one of the electronic devices and with the information about the position obtained;
e) sending, from the central control module as a result of the message received, control instructions to a processor module of at least one of the electronic devices, wherein the at least one device is determined depending on the information about the position of the control device included in the message.

The present invention optionally contemplates obtaining information about the position of the control device, depending on the positioning signals received, by means of triangulating said positioning signals received in the control device, for thereby obtaining coordinates of the position of said device.

The positioning signals used in the present invention are preferably BLE, i.e. Bluetooth 4.0, signals comprising a unique identifier and information about the emitting power.

According to one of the particular embodiments of the method of the present invention, regulating an intensity parameter of a LED-type luminous device by means of the interaction of a user with a mobile control device is contemplated, wherein said interaction causes a message to be sent to the central control module with indications of said interaction, together with information about the location of the user, and the control instruction subsequently to be sent to regulate the intensity parameter of the LED-type luminous device closest to the user, based on the comparison of the information about location and a two-dimensional map stored in the central control module with the coordinates of all the LED-type luminous devices.

Advantageously, the present invention therefore provides a method and a system by means of which any type of nearby electrical or electronic devices is informed of its presence, so that the latter can with said knowledge after that time act. For example, the control devices, or switches, without requiring any configuration, may detect which device to act on at all times, and taking into account the fact that lighting devices are usually located in fixed positions in the space, the unique signals identifying each luminous device allow the control devices, or mobile switches, to be able to unequivocally discern their location in the space, with the obvious benefits of precise indoor locating.

Other simpler examples of use would allow a technical maintenance team to very precisely locate a device hidden in a false ceiling, under a raised floor, or inside a cupboard or closet.

With the beacons normally deployed in relatively hidden places, without the help of any visual or auditory mechanism for locating them, carrying out maintenance jobs such as replacing them or changing the batteries, is not an easy task. As a result, according to the present invention deploying electrical or electronic devices with beacon capabilities (sockets, lighting devices, WiFi access points, etc.) entails a number of advantages in locating same, so the present invention not only strengthens a method and system of controlling electrical or electronic devices, but rather according to one of the embodiments, it provides support for the deployment of networks of beacons in large retail outlets, such as shopping malls, for example, thereby amplifying its advantages.

On one hand, it allows deploying beacons with a direct connection to the power grid, which prevents having to replace them when the batteries die. Alternatively, the beacons can be powered by means of small batteries which, in fact, have a long duration due to the low consumption of BLE communications, but in environments for which the present invention is proposed, with a number of electrical or electronic devices and beacons associated with them, monitoring the state of the batteries is a problem, so being powered directly by means of USB, for example, utilizing the same power supply as the electrical or electronic device to which each beacon is associated, solves this problem of maintenance and makes the use thereof in a real scenario much more comfortable.

On the other hand, it is possible to distribute the beacons homogenously in the space without having to hide them since the lighting devices must generally be visible and usually cover the entire physical space.

Furthermore, one of the embodiments of the present invention contemplates making the process of detecting the beacons easier as a result of the interconnection between the light control device and the actual beacon management system, making it possible for the luminous device itself to be able to respond visually to provide support for quick localization, for example by flashing the light beam on and off for 10 seconds, if the operator was trying to locate a beacon with a specific identifier.

The integrated system of detecting beacons from the actual lighting devices, the detection of other beacons deployed in a shopping space is likewise possible, allowing the actual lighting systems that are located the closest to the beacon can advantageously light up to visually indicate the location thereof.

Another one of the advantages derived from the present invention according to one of its embodiments is that the luminous devices with beacon capabilities can continuously pick up the state of the battery of other beacons located in the same network but not connected to luminous devices, so it is possible to report a low battery state or other situations that may require assistance sooner.

The following specification and the attached drawings can be used as a reference to better understand these and other aspects of the invention, its objects and advantages.

BRIEF DESCRIPTION OF THE SEVERAL VIEWS OF THE DRAWINGS

To complete the description that is being made and for the purpose of contributing to better understanding of the features of the invention according to an example of one of the embodiments thereof, a set of drawings are attached to said description as an integral part thereof, in which the following is depicted by way of non-limiting illustration.

DESCRIPTION OF SPECIFIC EMBODIMENTS OF THE INVENTION

What is defined in this detailed description is provided to help fully understand the invention. Accordingly, those having average skill in the art will recognize that variations, changes, and modifications of the embodiments described in the present specification are possible without departing from the scope of the invention. Furthermore, the description of functions and elements that are well known in the state of the art are omitted for the sake of clarity and concision.

The embodiments of the invention can logically be implemented in a wide range of architectural platforms, protocols, devices, and systems, so the specific designs and implementations presented herein are provided solely for purposes of illustration and comprehension, and never for limiting aspects of the invention.

The present invention discloses a system for controlling electrical or electronic devices, primarily light sources (but also applicable to other electrical or electronic devices, such as sound devices or WiFi access points, for example), wherein according to one of the embodiments of the invention, it comprises a series of modules interconnected to one another and to the electrical or electronic device itself to perform all the functionalities it offers.

Figure 1:
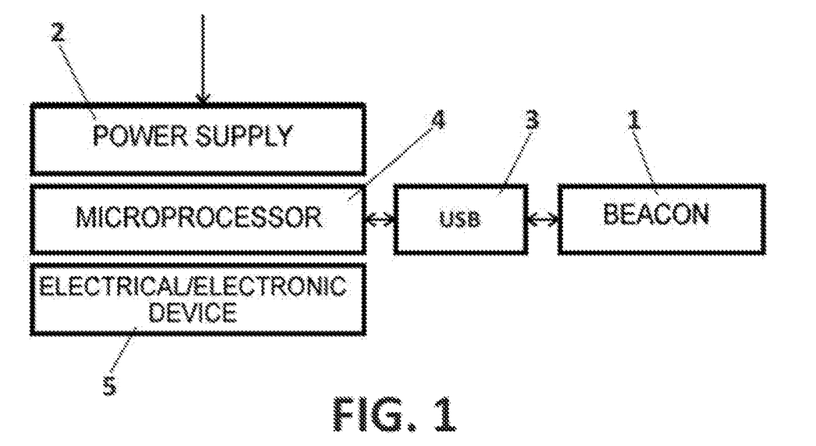
FIG. 1 shows a generic block diagram of the components which are interconnected to the electrical or electronic device according to one of the embodiments of the invention.

As can be seen in FIG. 1, according to this embodiment the essential components that are interconnected to the electrical or electronic device (5) comprise at least positioning means, such as, for example, one or more BLE 4.0 receiving and emitting circuits, i.e., a beacon (1), with its antenna and its control circuit connected to a power supply (2) by means of any type of connection, such as a USB-type connection (3), for example; and a processing module, which is implemented in this embodiment in a general purpose processor (CPU) assembled in a microcomputer (4), connected to the control circuits of the electrical or electronic device and to the beacon device, such that it can control the signals emitted by the latter as well as read the signals generated by other beacons in the surrounding area. Said control circuits of the electrical or electronic device allow, for example, cutting off the current, regulating the intensity, or any other action on the device as a result of the signaling received from the microcomputer. The microcomputer in turn is connected to the data network by means of structured wiring, a wireless network, or any other mechanism. Furthermore, according to one of the embodiments it can be equipped with a solid state drive or other persistent storage means for storing the evidence detected from the antenna of the beacon.

Figure 2:
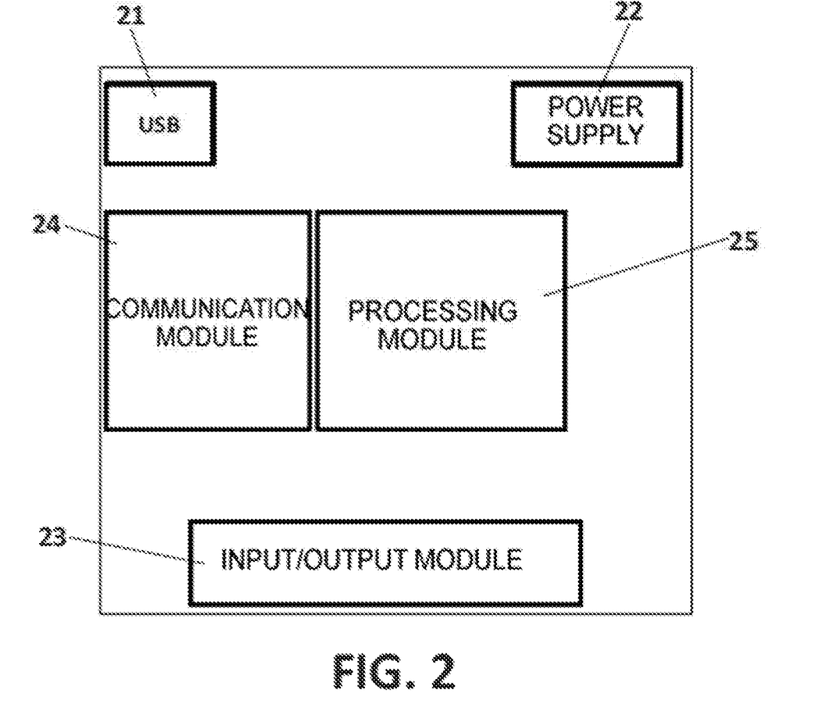
FIG. 2 shows one of the possible embodiments for the microcomputer, in which different functional modules interconnected to one another are depicted.

FIG. 2 shows one of the possible embodiments for the microcomputer (4), in which different functional modules interconnected to one another are included. This embodiment includes a USB connector (21) for connecting and supplying the beacons described above. A power supply (22) is also included, and a general-purpose input/output module (23) is included. The core of the microcomputer is made up of a communication module (24), with WiFi and Ethernet network interfaces, and a CPU processing module (25) with a microprocessor and preferably a solid state memory and a bus.

The beacons of the present invention emit a signal with a unique identifier that is perceptible in the vicinity. Said signal allows determining the emission distance depending on the received power, so in surrounding areas with multiple electrical or electronic lighting devices, the receiver of the signal can differentiate between the ones that are closest and the others. One of the particular embodiments of the invention contemplates a beacon-type emitting circuit based on Bluetooth Low Energy (BLE) technology.

The present invention solves the difficulties in locating given electrical or electronic devices and/or acting on them (WiFi access points, sockets, light sources, etc.) by announcing, by means of the signals, preferably BLE signals, described above, the unequivocal presence of each of the electrical or electronic devices to other nearby devices such as, according to one of the embodiments of the invention, a mobile or fixed switch. Said mobile switches can thereby act on said electrical or electronic device, primarily a light source, to regulate its intensity, turn it on, turn it off, or even regulate the color or the fluctuation of its light emission.

According to one of the embodiments of the invention, the mobile or fixed switches are configured for detecting the signal emitted by each of the devices and for communicating, either by wireless or wired means, with a switching control module, which emits the orders corresponding to the electrical or electronic device identified. According to different embodiments of the invention, the mobile switching devices are implemented on a mobile telephone, a tablet, or any other similar electrical or electronic device with the capability to receive and interpret the signal from the lighting device (BLE receiver) and with the capability for wireless communication with the local network or Internet in order to reach the control unit which carries the information to the suitable device or group of devices. This advantageously means that a maintenance operator user of the system and carrier of a mobile switch could act on the device at hand in an unequivocal manner without having to specifically identify it by simply being located close to the electrical or electronic devices.

The electrical or electronic devices, primarily luminous devices, are connected to centralized switching systems which receive through wireless means or by means of the direct connection, the corresponding switching orders or setting orders of the corresponding signal, particularly light signals in the case of luminous devices. This switching control unit can be in the network or in the device itself.

On the other hand, according to one embodiment of the invention the electrical or electronic devices can include BLE signal receivers to detect the presence of other nearby devices. Said receivers are connected to a general processor (CPU) locally storing the detection evidence and sends it to another processing module by means of a network connection. In this processing module, the composition of the network of electrical or electronic devices and BLE signal emission points is determined by mixing the evidence collected by all the electrical or electronic devices and triangulating the signal. As a result of this feature, each device is identified in an unequivocal manner by means of a mobile device and the corresponding application software, as a result of being nearby but without physical contact, which allows acting on these devices in a simple manner (turning on, intensity, color, etc.) by means of transmitting the orders by network to a central control system.

Furthermore, as a result of the beacons of the system, and without having to predetermine lighting device circuits, a very clear picture of the location of each element of the network of electrical or electronic devices, preferably for lighting, is obtained by means of triangulating the signals received from each device. Since each of them is aware of the nearby devices and receives an indication of the strength of the signal, enough information is obtained to construct a three-dimensional map of the distribution of the devices in the space.

According to one of the particular embodiments of the invention, a specific application allows turning off not only an isolated device, but also operating on the network by first turning off one, then those that are nearby, then the next circle and so on and so forth since the system knows where the emitter is located and where the rest of the devices around said emitter are located at all times. Operation of the network of devices and their management is thereby made easier without having to interconnect the devices in the same electrical circuits or predetermine these circuits in any way.

There are many and widely differing electrical or electronic devices (5) to which the present invention can be applied. As discussed above, the application thereof is more obvious in lighting devices, sound systems, sockets, or WiFi access points, but it can also be applied to any other type of electrical or electronic device that is homogenously deployed in large retail outlets.

One of the particular embodiments of the invention refers to applying the system and method for control of the present invention to controlling a set of speakers distributed homogenously throughout a large physical space. For example, a multipurpose conference and concert hall in which has been deployed a network of powered speakers in order to provide good acoustic coverage all over, where each of the speakers is connected to its own system for control and location according to that which has been described for the present invention. Once the speakers along with the rest of the components of the system of the invention have been deployed, the beacons start to emit BLE signals so that the other nearby devices are aware of its presence. As a result of each of the devices being capable of not only emitting but also of listening (by means of BLE receivers), each of them is capable of sensing the presence of the other devices, of sensing their distance (estimating it depending on the signal power received, taking into account that the sent signal itself contains information about its emitting power), and of emitting to a central control unit the relative location of each of them. By means of signal triangulating algorithms, the central control module is capable of creating a two-dimensional map of the location of the different speakers, so as a result of the precise knowledge of the location of each speaker in the space and of the set of all of them, and as a result of the unequivocal identification of each device, the system is capable of sending, through the control units integrated in the invention, volume instructions to balance out the sound in the hall according to the desired sound effects. Therefore, once the sound has been adjusted according to the algorithms, the sound in the hall is much more balanced without requiring any human intervention.

Additionally, if the physical space has objects that hinder the distribution of the sound and make said sound flow differently than what the software of the module of control may envisage depending on the corresponding modeling algorithms, then the present invention offers a very simple and effective adjustment mechanism that the sound technicians could use without having any specific knowledge about the installation or theoretical sound propagation basics. Said sound technicians are provided with a control device or mobile switch, in this case a mobile telephone with BLE capability, in which a certain application software has been installed to enable interacting with the system and detecting the presence of other beacons around it, being able to triangulate the position of the technician relative to the speakers distributed throughout the hall. By complying with the sole requirement of keeping the Bluetooth activated, sound technicians can walk around the physical space carrying the control device or mobile switch while the music or sound can be heard through the speakers so as to detect sound perception anomalies from any location. For example, in the event of hearing with his or her own ears that a less intense volume is received in a side area than in the rest of the space, with a simple interaction by means of the application of software installed in the mobile telephone, the sound technician indicates that he or she wants a higher volume on that side in compensation. Unlike the complexity this task usually entails, where the technician has to evaluate which speakers are the ones that are functioning anomalously and act on them based on his or her knowledge of the installation, the present invention performs this entire task in an autonomous manner with the simple indication provided by the technician that a higher volume is required in the location in which he or she is located. After this point, that order reaches the central control module together with the details about the location of the mobile telephone relative to all the nearby speakers. With that information, the central module determines which speakers are to be sent the signal for a higher or lower volume, in order to generate the desired effect, which is previously configured and can be applied immediately. The central module will send to each of the affected devices, by means of a wired or wireless connection, a signal to adjust their volume in a precise and immediate manner.

A particular embodiment of the present invention refers to the application of the system and method for control disclosed above for controlling a plurality of lighting devices. In a scenario similar to the one described in the case of the preceding use referring to a system of speakers, a network of lights embedded in the ceiling is deployed in a physical space (for example a shop), with each of the lights being interconnected with the rest of the components of the invention as described above. Therefore, the general term of FIG. 1, i.e., "electrical or electronic device" (5), is replaced in this specific configuration with a lighting device, which in turn is represented by a LED controller module (30) and a LED module (40).

Figure 3:
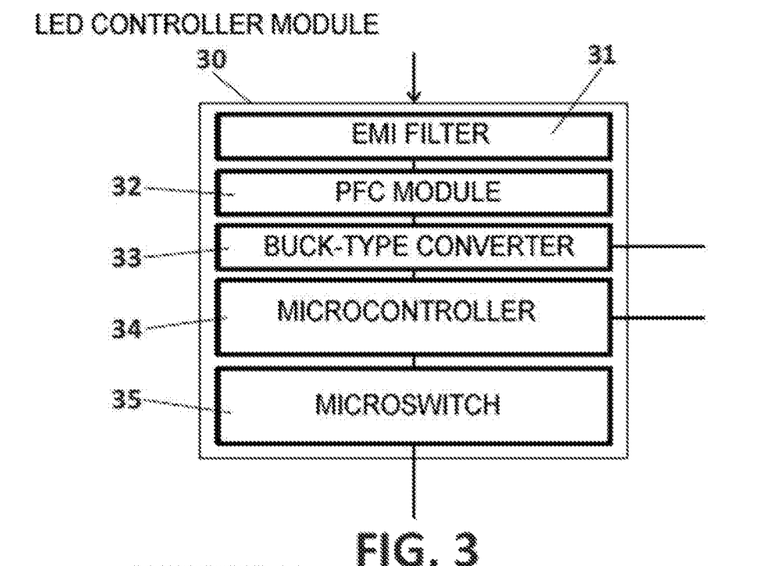
FIG. 3 shows the LED controller module and several internal components according to a particular embodiment of the invention.

FIG. 3 shows the LED controller module (30), which is connected between the microcomputer (4) and the LED module (40), as well as its internal components, according to one of the embodiments of the invention, which in this case are represented following the order in which they are supplied, an electromagnetic interference filter or EMI filter (31), a power correction PFC module (32), a Buck-type converter (33) for reducing the power, a microcontroller (34), and a microswitch (35).

Figure 4:
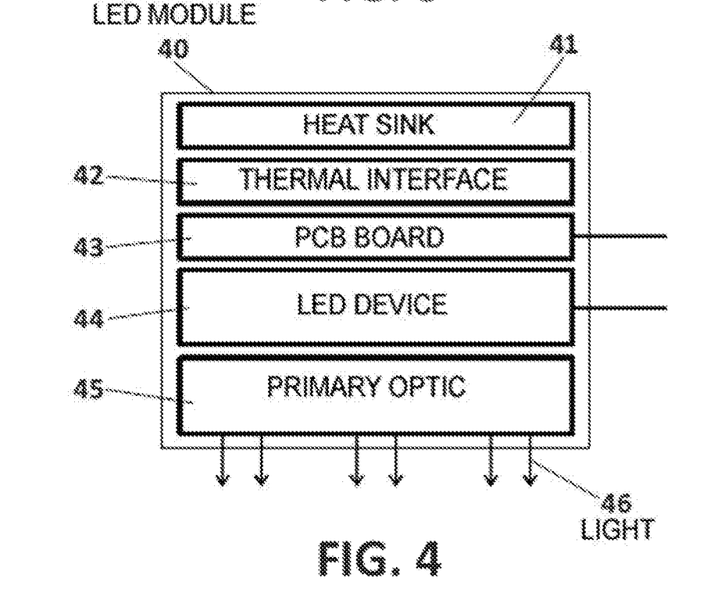
FIG. 4 shows a second module of the lighting device, the LED module which is connected after the LED controller module, according to a particular embodiment of the invention.

FIG. 4 shows the second module of the lighting device, the LED module (40), which is connected after the module controller (30), and according to one of the embodiments of the invention, comprises the following components in the order in which they are supplied: a heat sink (41) for reducing the temperature of the device, a thermal interface (42), a PCB board (43), LED devices (44) for emitting the light (46), and a primary optic (45) which primarily serves as protection for the LED devices. In any case, the lighting devices can be implemented in a number of different ways without their functionality being modified at the core.

Figure 5:
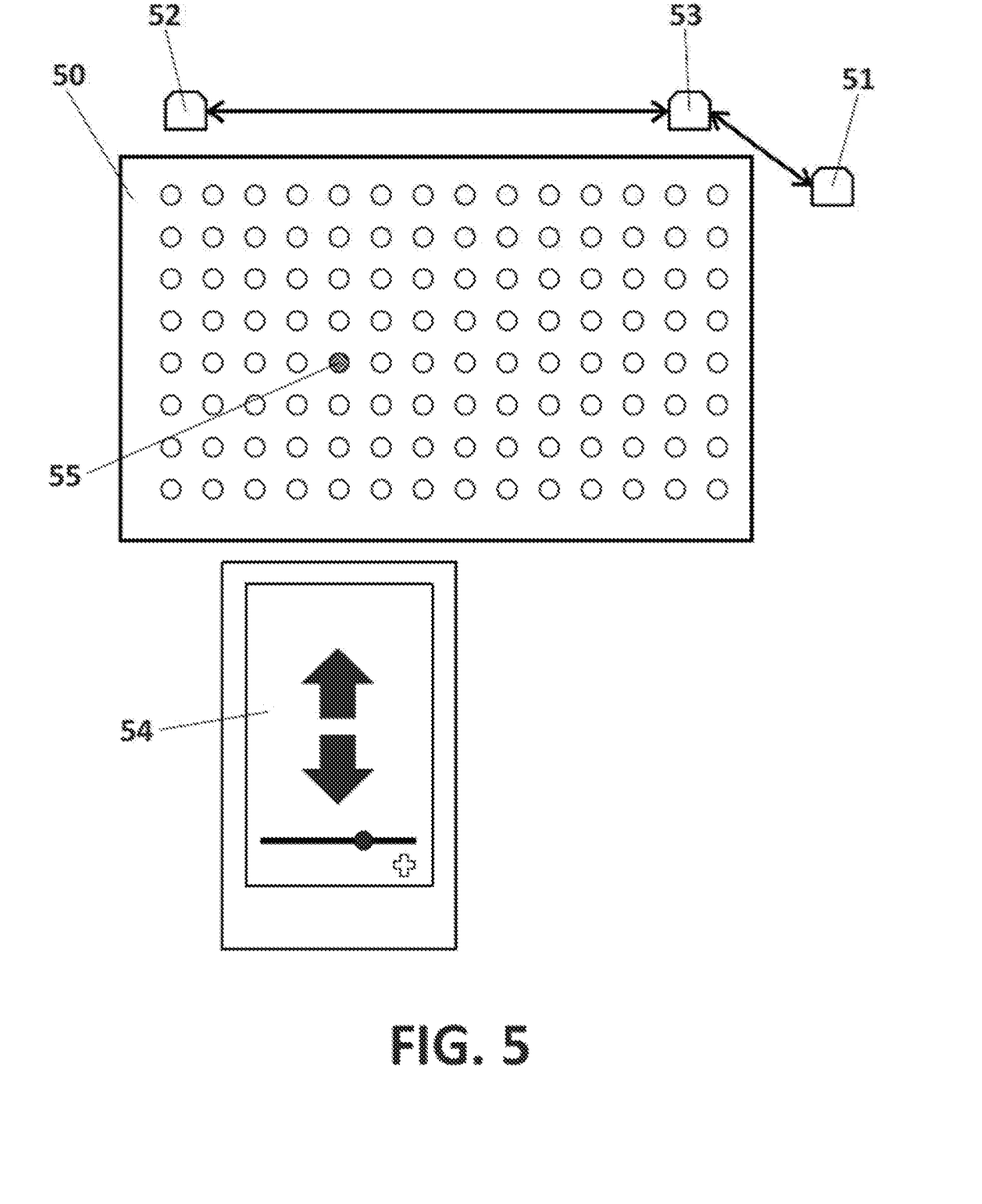
FIG. 5 schematically shows the configuration of a particular embodiment of the invention, in which a plurality of lighting devices that are homogenously distributed throughout a physical space is illustrated.

FIG. 5 schematically shows the configuration of this particular embodiment, wherein the plurality of lighting devices (50) are distributed homogenously throughout a physical space, as discussed above. The installation has a central control module (51) sending the corresponding signals to the lighting devices through a wireless access network (52), although it could likewise be a wired access network, and a control device or switch (53) which, in communication with said central control module, sends the instructions to act on the configuration of one of the lighting devices (55) connected with said central module in a location-based manner. The control device or switch, which can be mobile and implemented in a mobile telephone or a tablet, is carried by an operator interacting with application software (54) installed in said mobile telephone or tablet for sending the aforementioned instructions depending on the perception thereof in the surrounding area.

Once the luminous devices together with the rest of the components of the system of the invention have been deployed, the beacons start to emit BLE signals so that other nearby devices are aware of its presence. As a result of each of the devices being capable of not only emitting but also of listening (by means of the BLE receivers), each of them is capable of sensing the presence of the other devices, of sensing their distance (estimating it depending on the signal power received, taking into account that the sent signal itself contains information about its emitting power), and of emitting to the central control unit the relative location of each of them. By means of signal triangulating algorithms, the central control module creates a two-dimensional map of the location of the different luminous devices, so as a result of the precise knowledge of the location of each luminous device in the space and of the set of all of them, and as a result of the unequivocal identification of each device, the system is capable of sending, through the control units integrated in the invention, instructions for adjusting a parameter, such as the intensity of the luminous devices, for example, according to the desired light effects.

The light operator is provided with a control device or switch which, according to an embodiment of the invention, is implemented in a mobile telephone or a tablet, incorporating a specifically developed application with software for determining the precise position of the user carrying the control device, or switch, within the space in which the luminous devices have been deployed. In this scenario, the light operator moves around the physical space, such as a shop, for example, carrying the control device, or mobile switch, with the application installed thereof. While moving around, the operator detects points where, under his or her perception, the lighting has to be modified in order to highlight a given product line, creating a certain atmosphere in a part of the shop, creating lights effects or any other similar variation. By means of a simple interaction with the switch using the interface of the application that is provided, the operator can emit his or her instructions to lower/increase the light intensity at the point where he or she is located, or any other instruction required for the effects discussed above. The mobile switch sends said instructions together with the information about the position obtained from the control device, or switch, itself such that the central module wirelessly receives both the orders and the context information that allow it to act on the luminous devices of the physical context in which the operator is located. Therefore, the central module sends to each of the lighting devices of that physical context, by means of a wired or wireless connection, a signal for adjusting the intensity thereof in a precise and immediate manner, without the operator having to have any particular knowledge about the installation or the connections of the luminous devices.

Some preferred embodiments of the invention are described in the dependent claims included below.

In this text, the word "comprises" and its variants (such as "comprising", etc.) must not be interpreted in an exclusive manner, i.e., they do not exclude the possibility that what is described may include other elements, steps, etc.

The description and drawings simply illustrate the principles of the invention. Therefore, it must be observed that those skilled in the art may conceive of several arrangements which, though not explicitly described or shown herein, represent the principles of the invention and are included within its scope. Furthermore, all the examples described herein are primarily provided for illustrative purposes in order to help the reader understand the principles of the invention and the concepts provided by the inventor or inventors to improve the art, and they must be considered as being non-limiting with respect to such examples and conditions described in a specific manner. Furthermore, the entire description provided herein relating to the principles, aspects, and embodiments of the invention, as well as the specific examples thereof, cover equivalencies thereof.

Although the present invention has been described in reference to specific embodiments, those skilled in the art must understand that the foregoing and various other changes, omissions, and additions in the form and the detail thereof can carried out without departing from the scope of the invention as defined by means of the following claims.

What is claimed is:

1. Location-based system for controlling a plurality of electrical or electronic devices (50), characterized in that it comprises:
   a plurality of positioning means (1) which comprise a Bluetooth 4.0 emitter and receiver with beacon functions and each coupled to each of a plurality of electrical or electronic devices, said plurality of positioning means (1) configured for sending and receiving positioning signals, wherein said plurality of electrical or electronic devices are geographically distributed in a 3 Dimensional (3D) space and having a shared functionality;
   a control device (53) configured for receiving the positioning signals, determining a position of said control device based on the positioning signals received, and sending messages with information about said position to a central control module (51), together with indications to act on at least one parameter of said shared functionality;
   a central control system (51) configured for receiving the messages from the control device, selecting at least one of said plurality of electrical or electronic devices and sending control instructions to act on said at least one parameter, to said at least one of the plurality of electrical or electronic devices, wherein the selection of the at least one of the plurality of electrical or electronic devices is determined depending on the information about the position of the control device contained in the received message and on a location information of each of said plurality of electrical or electronic devices used by said central control system; and
   a plurality of hardware processors (4) each coupled to one of the plurality of said electrical or electronic devices, configured for receiving the control instructions from the central control system (51) and configured for directly acting on the at least one parameter of a respective electrical or electronic device (55) depending on the control instructions received from the central control system.

2. The system according to claim 1, wherein each of the plurality of electrical or electronic devices is connected to a supply point of a power grid, which further comprises that each of the positioning means coupled to the respective electronic devices is supplied by the same supply point as its corresponding electronic device.

3. The system according to claim 1, wherein the positioning signals comprise a unique identifier, associated with one of the plurality of electrical or electronic devices, and information about an emitting power emitted by said one of the plurality of electrical or electronic devices.

4. The system according to claim 1, wherein the control device is a mobile telephone, a tablet, or any other portable electronic device with Bluetooth 4.0 signal transmission/reception capabilities.

5. The system according to claim 1, wherein the central control system is configured for creating a two-dimensional or three-dimensional map, with the location of all the electrical or electronic devices in said defined area.

6. The system according to claim 5, wherein the central control system is furthermore configured for determining the sending of the control instructions to the hardware processor of the at least one electrical or electronic device closest to the control device by means of comparing the information about the position received from the control device with the map of the plurality of electrical or electronic devices.

7. The system according to claim 1, wherein the hardware processor comprises a USB connector (21) for connecting and supplying the positioning means, a power supply (22), a general-purpose input/output module (23), a communication module (24) with Ethernet and/or WiFi network interfaces, and a CPU processing module (25) with a microprocessor and storage means.

8. The system according to claim 1, wherein the plurality of electrical or electronic devices are luminous devices and the parameter that is acted on is an intensity parameter of the luminous device.

9. The system according to claim 8, wherein the luminous devices are LED-type luminous devices and comprise a LED controller module (30) comprising: an electromagnetic interference filter (31), a power correction PFC module (32), a Buck-type converter (33), a microcontroller (34), and a microswitch (35); and a LED module (40) comprising a heat sink (41), a thermal interface (42), a PCB board (43), LED devices (44), and a primary optic (45).

10. The system according to claim 1, wherein the electronic devices are sound devices, WiFi access points, or sockets.

11. Location-based method for controlling a plurality of electrical or electronic devices, characterized in that it comprises the steps of:
    a) sending at least one positioning signal from a plurality of positioning means which comprise a Bluetooth 4.0 emitter and receiver with beacon functions and coupled to each of a plurality of devices, wherein said plurality of devices are geographically distributed in a 3 Dimensional (3D) space and having a shared functionality;
    b) receiving the at least one positioning signal in a control device;
    c) obtaining information about the position of the control device, said position of the control device is determined based on the positioning signals received;
    d) sending a message to a central control system with indications for acting on at least one parameter of said shared functionality and with the information about the obtained position of said control device;
    e) selecting at least one of said plurality of devices based on the information about the obtained position of the control device contained in the received message and on a location information of each of said plurality of devices obtained by said central control system; and
    f) sending, from the central control system, control instructions to at least one of a plurality of hardware processors, each coupled to a respective one of said plurality of devices, wherein said control instructions are sent to respective hardware processors of said selected at least one of the plurality of devices, said control instructions instruct said respective hardware processors to directly act on the at least one parameter.

12. The method according to claim 11, wherein obtaining information about the position of the control device, depending on the positioning signals received, comprises triangulating said positioning signals received in the control device for obtaining coordinates of the position of said device.

13. The method according to claim 11, wherein the positioning signals are Bluetooth 4.0 signals comprising a unique identifier and information about the emitting power.

14. The method according to claim 11, wherein said method comprises regulating an intensity parameter of a LED-type luminous device by means of the interaction of a user with a mobile control device, wherein said interaction causes a message to be sent to the central control system together with information about the location of the user and the control instruction subsequently to be sent to regulate the intensity parameter of the LED-type luminous device closest to the user, based on the comparison of the information about location and a two-dimensional or three-dimensional map stored in the central control system with the coordinates of all the LED-type luminous devices.

* * * * *